US005716492A

United States Patent [19]

Li

[11] Patent Number: 5,716,492
[45] Date of Patent: Feb. 10, 1998

[54] TAPE CUTTER AND SELF-ADHESIVE LABEL PEELER

[76] Inventor: Po Wen Li, 7F-3, No. 78, Sec. 3, Roosevelt Rd., Taipei, Taiwan

[21] Appl. No.: 561,279

[22] Filed: Nov. 21, 1995

[51] Int. Cl.[6] .................................................. B32B 31/00

[52] U.S. Cl. ......................... 156/538; 156/577; 156/584; 156/580; 156/524; 156/510; 221/217; 221/30; 101/93; 101/91

[58] Field of Search ................................ 221/74, 30, 73, 221/203, 217, 230, 186, 185; 156/584, 526, 527, 543, 574, DIG. 48, 57, 7, 570, 575, 580, 256, 541; 101/287, 280, 291, 292, 295, 301, 305–310, 320, 324, 359, 360, 103, 56

[56] References Cited

U.S. PATENT DOCUMENTS

| | | | |
|---|---|---|---|
| 4,359,960 | 11/1982 | Sato | 101/295 |
| 5,324,153 | 6/1994 | Chess | 412/9 |
| 5,380,572 | 1/1995 | Kotani et al. | 428/40 |
| 5,482,182 | 1/1996 | Thompson et al. | 221/73 |

*Primary Examiner*—Merrick Dixon
*Attorney, Agent, or Firm*—Morton J. Rosenberg; David I. Klein

[57] ABSTRACT

Disclosed is a tape cutter and self-adhesive label peeler which associates a tape cutter stand with an engaging arm assembly so that it may not only cut an ordinary adhesive tape but also peel self-adhesive labels off from an under layer thereof. To use the device as a self-adhesive label peeler, put a roll of such tape into the cutter stand with a length of the tape from a front end thereof pulled beyond a front stop member, push the engaging arm assembly backward to attach to the cutter stand so that the front stop member is shifted upward to be between a front shaft and a leading member. At this position, an under layer of the tape is bent down to pass beneath the leading member while the harder self-adhesive labels on the under layer are not bent and are conveniently and quickly separated from the under layer.

1 Claim, 11 Drawing Sheets

TAPE CUTTER AND SELF-ADHESIVE LABEL PEELER

BACKGROUND OF THE INVENTION

An ordinary self-adhesive label includes an under layer and a label releasably adhered on the under layer. To use the label, it is usually to peel it off from the under layer by hand. When there are only limited quantity of self-adhesive labels to be used, they can, of course, be readily and economically peeled off from the under layers. On the other hand, however, when there are many or even large amount of such labels needs to be peeled off for use, it is apparently uneconomical to do so completely by hand. Since there is not any means that facilitates a convenient and quick separation of self-adhesive labels from the under layers, it is desirable to develop a device for such purpose.

Furthermore, a conventional tape cutter stand can only have one single ordinary adhesive tape positioned therein. To save the space occupied by the tape cutter stand and to facilitate the movement of the same for use, the tape cutter stand is usually designed to have only small dimensions. This is, on the other hand, inconvenient when there are many different tapes to be used at the same time because the tapes must be changed from time to time.

SUMMARY OF THE INVENTION

It is therefore a primary object of the present invention to provide a tape cutter and self-adhesive label peeler in which a tape consisting of an under layer and a plurality of self-adhesive labels releasably adhered on the under layer can be positioned in the tape cutter for use. When an engaging arm assembly is pushed backward to attach to two side walls of the tape cutter, a front stop member is shifted to a higher position between a front shaft and a leading member in front of the tape cutter, so that the under layer of the tape is bent down at the front stop member and passes beneath the leading member while the harder self-adhesive labels are not bent but separated from the under layer to pass a top of the leading member for use.

BRIEF DESCRIPTION OF THE DRAWINGS

The above-mentioned objects and the special structure of the present invention, as well as the technical means for operating the same can be best understood by referring to the following detailed description of the preferred embodiment and the accompanying drawings, wherein.

DETAILED DESCRIPTION OF THE PREFERRED EMBODIMENTS

The present invention relates to a tape cutter and self-adhesive peeler, mainly formed from a cutter stand 1 and an engageing arm assembly 3 attached to two side walls of the cutter stand 1.

Figure 1:
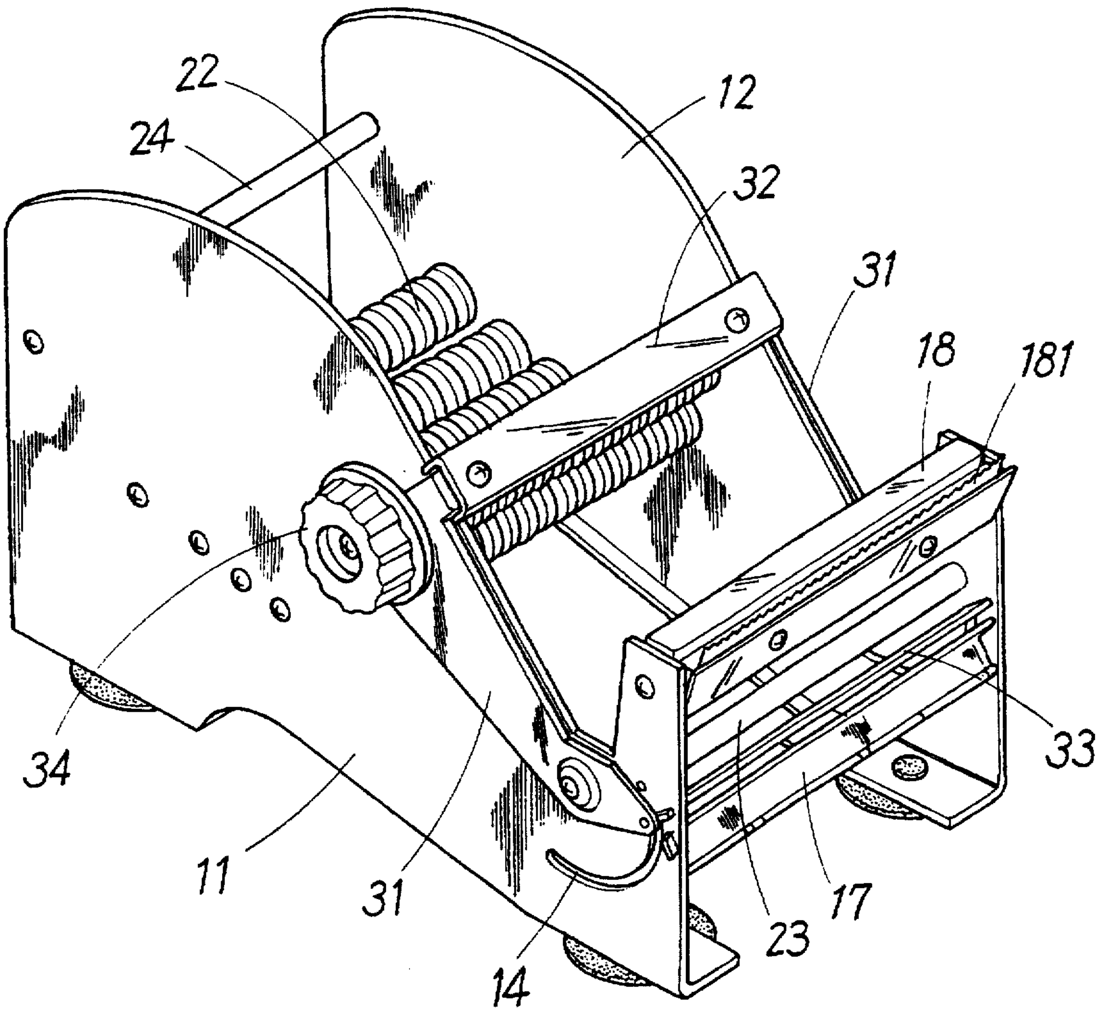
FIG. 1 is an assembled perspective showing the present invention.
Figure 2:
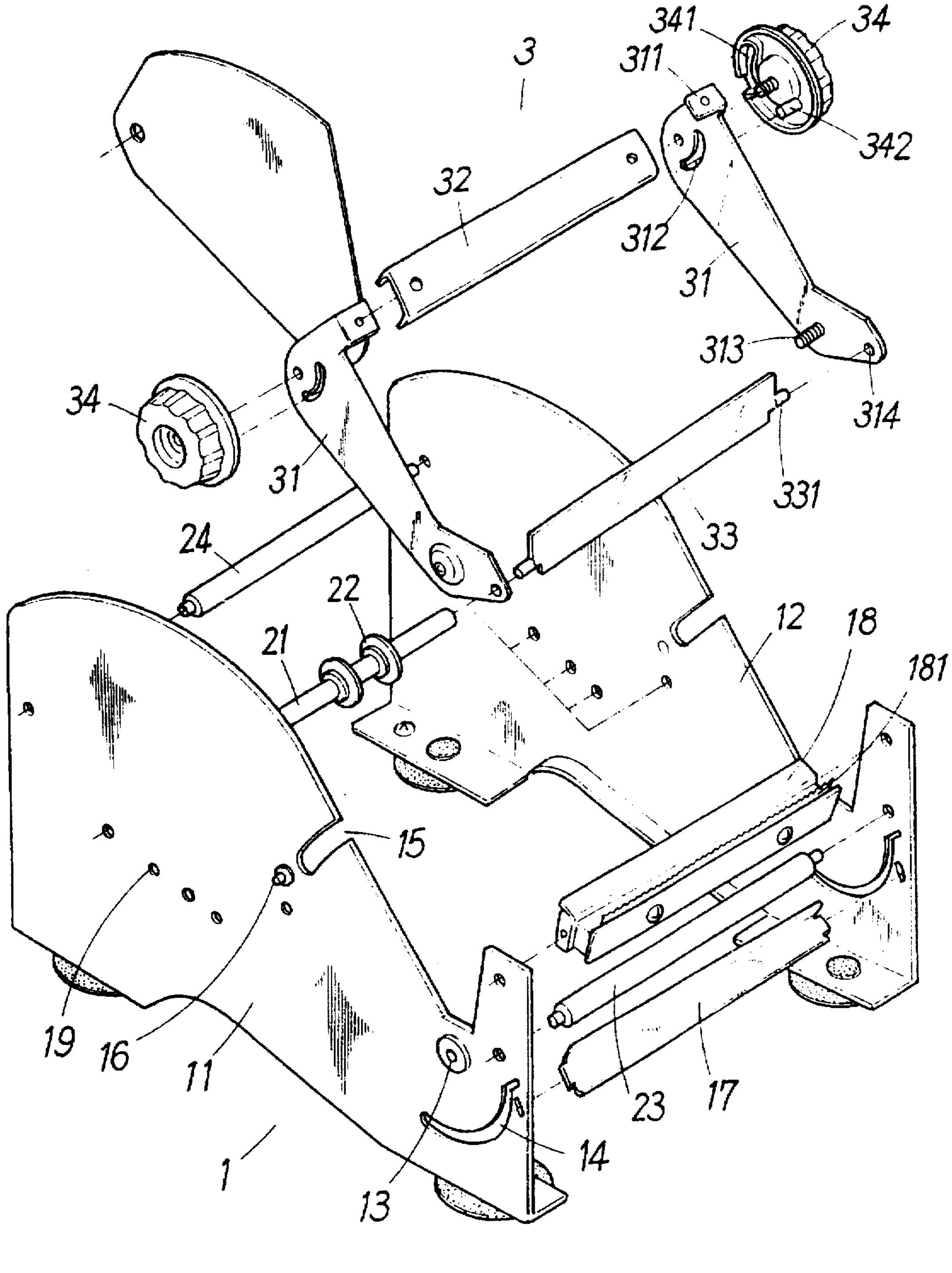
FIG. 2 is an exploded perspective of the present invention.

Please refer to FIGS. 1 and 2, the cutter stand 1 includes a left side wall 11, a right side wall 12, and a number of carrier shafts 21 disposed between the side walls 11 and 12.

The left and the right side walls 11, 12 are laterally symmetrical in shape. Suckers are provided at a bottom of each side wall 11, 12 to facilitate the stable position of the cutter stand 1. A pair of arm supports 13 in the form of two round holes are respectively provided on the side walls 11, 12 at a front middle point thereof. An acuated moving slot 14 is formed below each arm support 13 and is a curve with the arm support 13 as a circle center thereof. A square and a round holes are respectively formed at an outer and an inner side of the moving slot 14, so that a leading member 17 and a front shaft 23 are respectively supported on and between two oppositely positioned square holes and two oppositely positioned round holes. A Blade holder 18 is fixed above the front shaft 23 so as to together with the front shaft 23 and the leading member 17 connect front ends of the two side walls 11, 12 of the cutter stand 1 together. The side walls 11, 12 both have a backward and upward ascendant curvy top edge starting from a portion above the arm support 13, ending with a smooth curve and a rounded corner. A downward extended engaging slot 15 is formed near a middle point of the curry top edge of each side walls 11, 12. A stud 16 or the like is provided near a bottom end of each engaging slot 15. A row of shaft holding holes 19 are symmetrically formed in a rear half central portion of two side walls 11, 12, descending toward the front end of the cutter stand 1.

Around the carrier shafts 21, several shaft collars 22 are rotatably mounted. Each carrier shaft 21 is supported on and between two corresponding shaft holding holes 19. A rear shaft 24 having several spacers mounted therearound extends between a rear end of the side walls 11 and 12.

The engaging arm assembly 3 includes two side arm members 31 each having a connecting piece 311 inward extended from a rear top end thereof, a top connecting member 32 fixed to and between the side arm members 31 by connecting to the two connecting pieces 311. A central hole is provided at a rear lower end of each arm member 31 for a knob 34 to fix thereto. An arcuated pivotal slot 312 is slightly spacedly formed in front of each central hole for a pivotal block 342 provided inside the knob 34 to extend through. A front end of each arm member 31 is connected to a corresponding arm support 13 by means of a screw 313. A front stop member 33 is further disposed between two front ends of the arm members 31 by engagement of two projected ends 331 of the front stop member 33 into two stop member slots 314 formed at two front ends of the arm members 31.

The knob 34 each has an internal arcuated groove 341 starting from a point on a peripheral wall of the knob 34 and extending inward toward a center of the knob 34. The studs 16 or the like are guided by and move along the internal arcuated grooves 341 when the engaging arm assembly 3 is pushed back toward the side walls 11, 12 of the tape cutter stand 1 and the knobs 34 are turned to engage with the studs 16 or the like.

After the present invention is assembled, the arm members 31 are located at two outer sides of the right and the left side walls 12, 11 and are pivotally fixed thereto at the arm supports 13 by means of screws 313.

Figure 3:
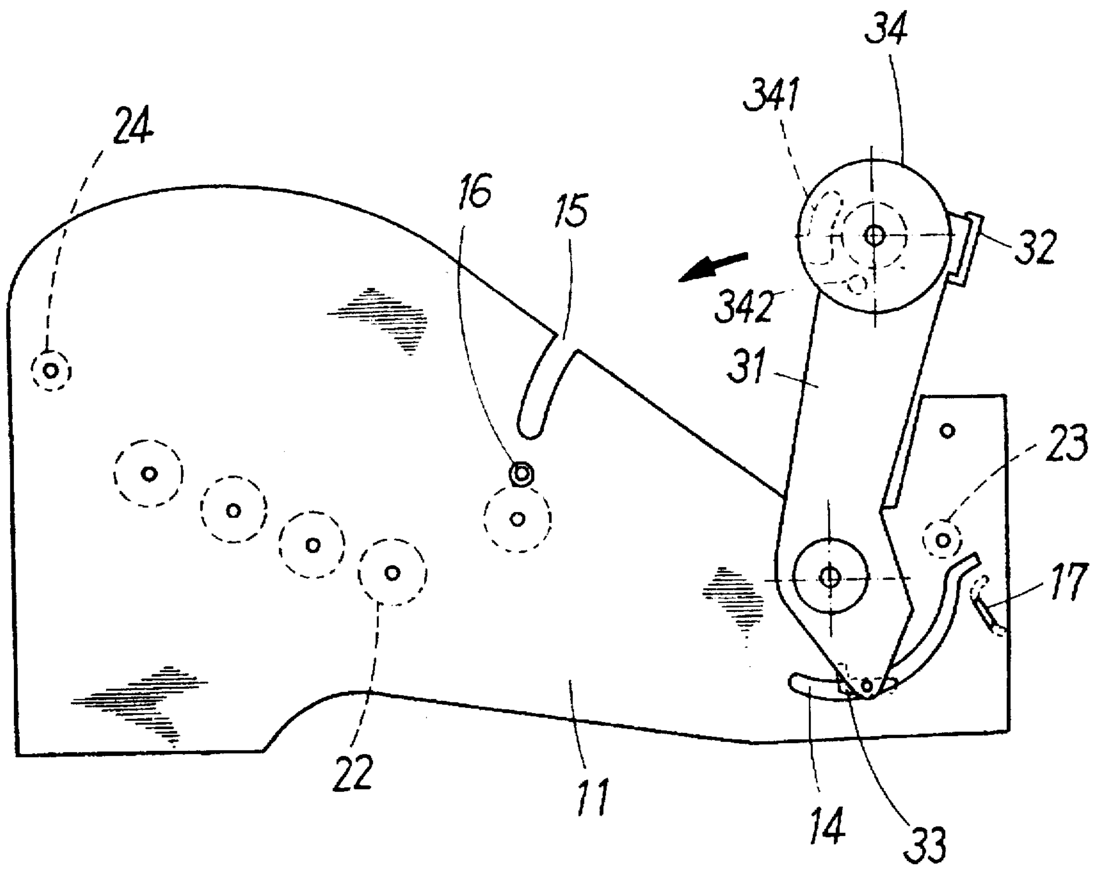
FIG. 3 is a schematic drawing showing the engagement of the engaging arm assembly with the side walls of the tape cutter of the present invention.
Figure 4:
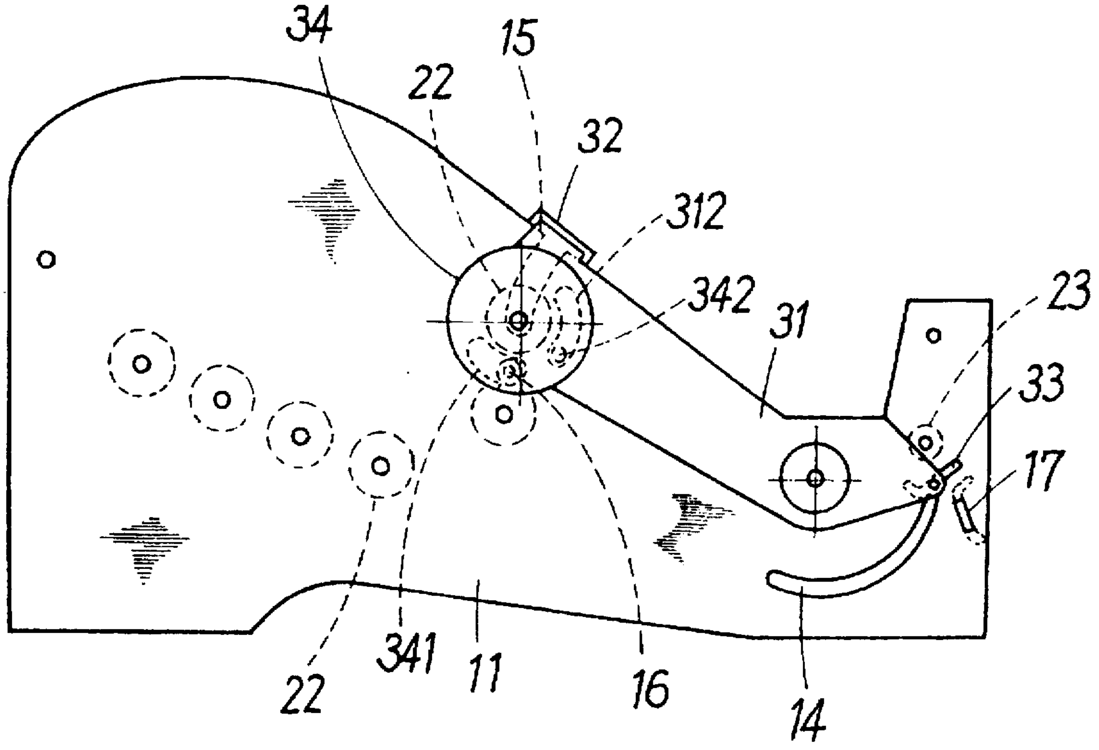
FIG. 4 is still a schematic drawing showing a further engagement of the engaging arm assembly with the side walls of the tape cutter of the present invention.
Figure 5:
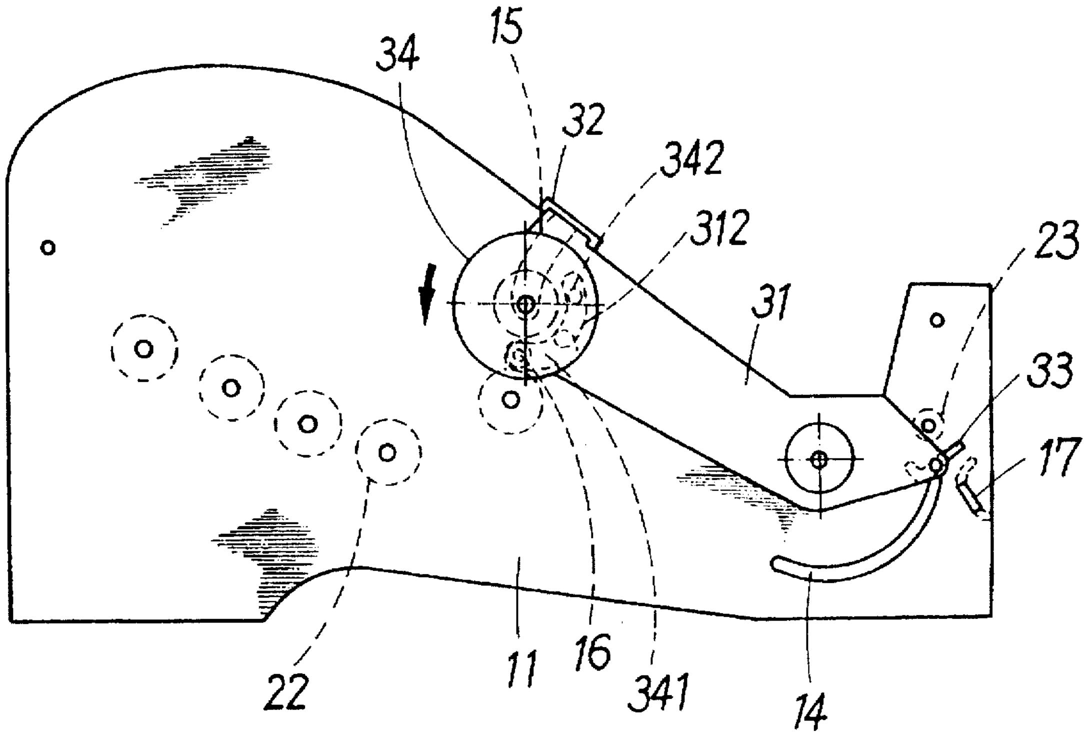
FIG. 5 is still a schematic drawing showing a still further engagement of the engaging arm assembly with the side walls of the tape cutter of the present invention.

Please refer to FIGS. 3, 4 and 5 for the engagement of the engaging arm assembly 3 with the cutter stand 1. The engaging arm assembly 3 is pivotally supported on the arm supports 13 with the screws 313 as two fulcrums. The front stop member 33 can be guided by and move along the arcuated slots 14. To get the engaging arm assembly 3 attached to the two side walls 11, 12 of the cutter stand 1, use two hands to hold the knobs 34, push the entire engaging arm assembly 3 backward toward the cutter stand 1 so that the knobs 34 are received in the engaging slots 15 with the internal arcuated grooves 341 formed at an inner side of the knobs 34 engaging with the studs 16 or the like. Turn the knobs 34 until they are retained at a fixed position. At this point, the carrier shafts 21 within the engaging arm assembly 3 are located to fixed positions, too. With the backward attachment of the arm members 31 to the side walls 11, 12, the front stop member 33 of the engaging arm assembly 3 is shifted in the moving slots 14 to a position between the leading member 17 and the front shaft 23 with clearances left between the front stop member 33 and the front shaft 23 as well as between the front stop member 33 and the leading member 17, completes a tape cutter and self-adhesive label peeler assembly as shown in FIG. 1. On the other hand, when the engaging arm assembly 3 is not backward attached to the cutter stand 1, it is pivotally turned to erect above the blade holder 18 to serve as a protector preventing a user from being accidentally injured by a cutting blade 181 on the blade holder 18.

Figure 6A:
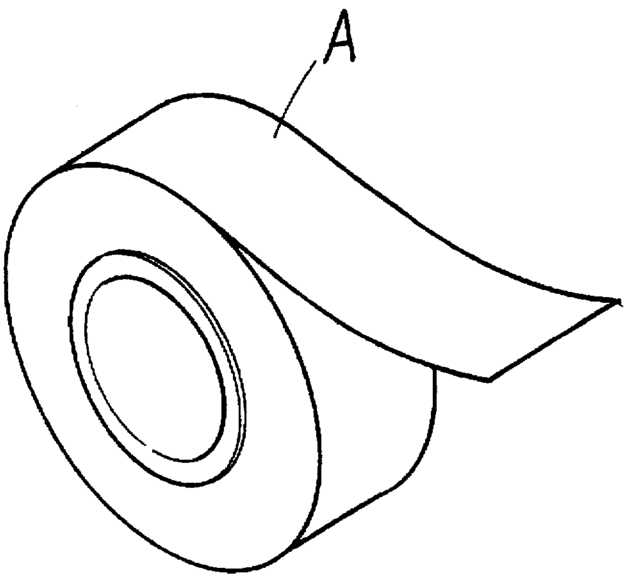
FIG. 6A illustrates a perspective view of a general adhesive tape roll.
Figure 6B:
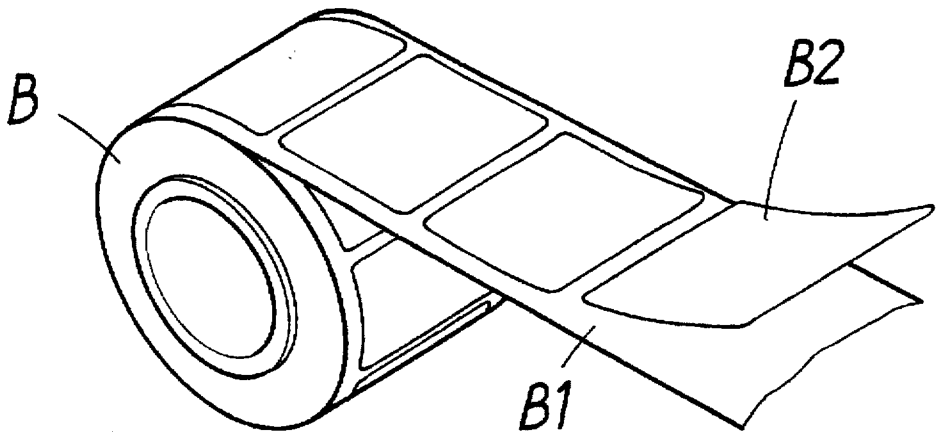
FIG. 6B illustrates a perspective view of a tape roll with self-adhesive labels.

Two types of tapes, i.e. an ordinary adhesive tape and a tape with self-adhesive labels, which can be used on the present invention are illustrated in FIGS. 6A and 6B respectively.

Figure 7:
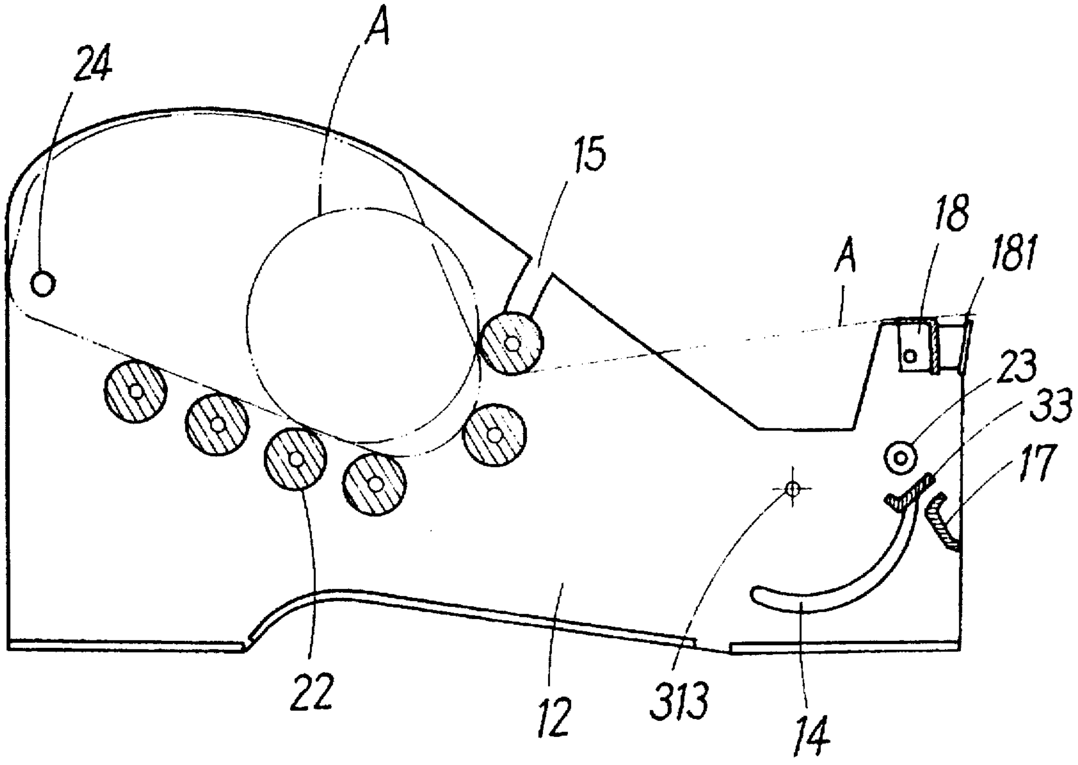
FIG. 7 illustrates the manner in which a general adhesive tape is positioned in the tape cutter of the present invention for cutting with the tape cutter.

Please refer to FIG. 7, a roll of ordinary adhesive tape A is seated in the cutter stand 1 and the engaging arm assembly 3 is backward attached to the side walls 11, 12 of the cutter stand 1. At this point, the tape A is ready for use through convenient cutting by the blade 181. With multiple carrier shafts 21 arranged in the cutter stand 1, adhesive tapes A in different sizes can be used at the same time. Spacers may be used to partition the adhesive tapes A from one another.

Figure 8:
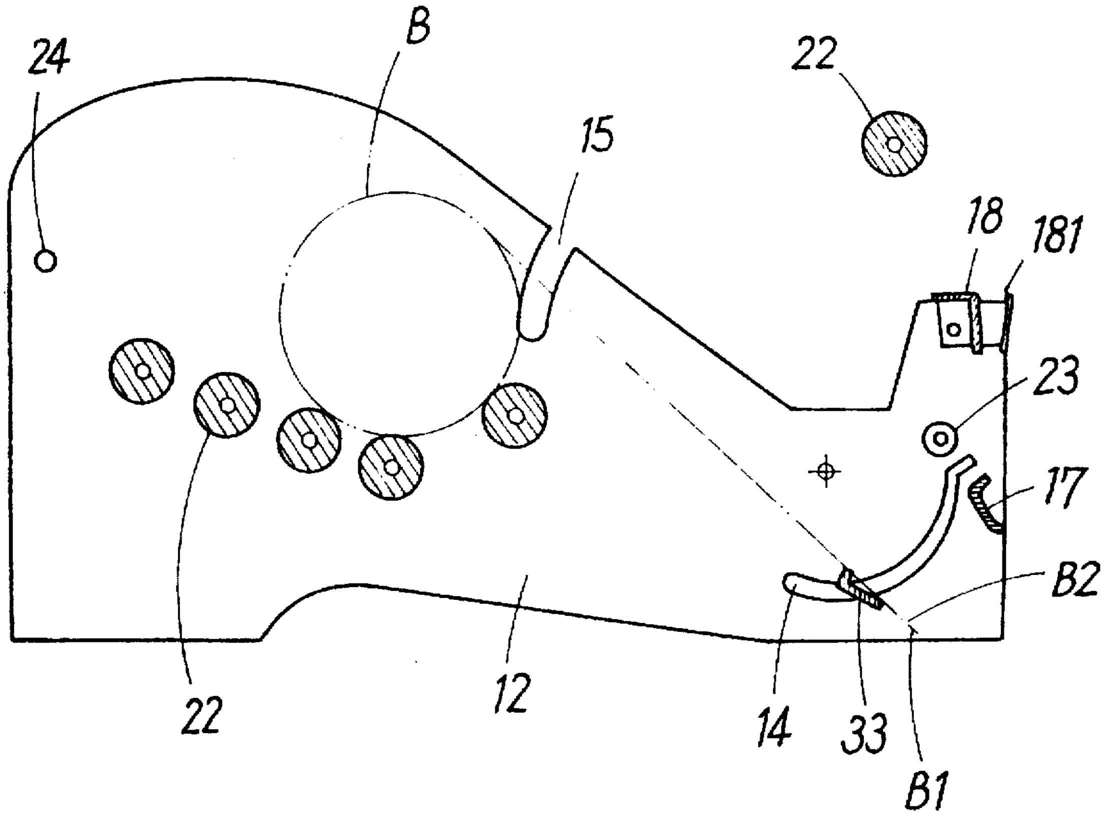
FIG. 8 illustrates the first step by which a tape with self-adhesive labels is positioned in the label peeler of the present invention for use.
Figure 9:
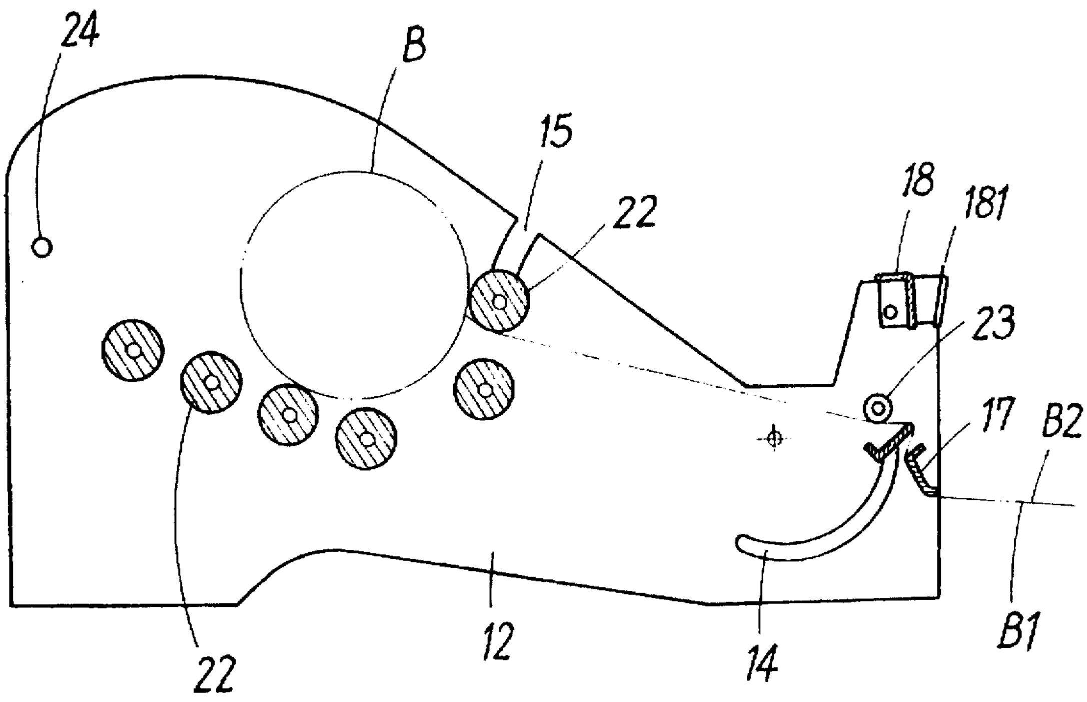
FIG. 9 illustrates the second step by which a tape with self-adhesive labels is positioned in the label peeler for use.
Figure 10:
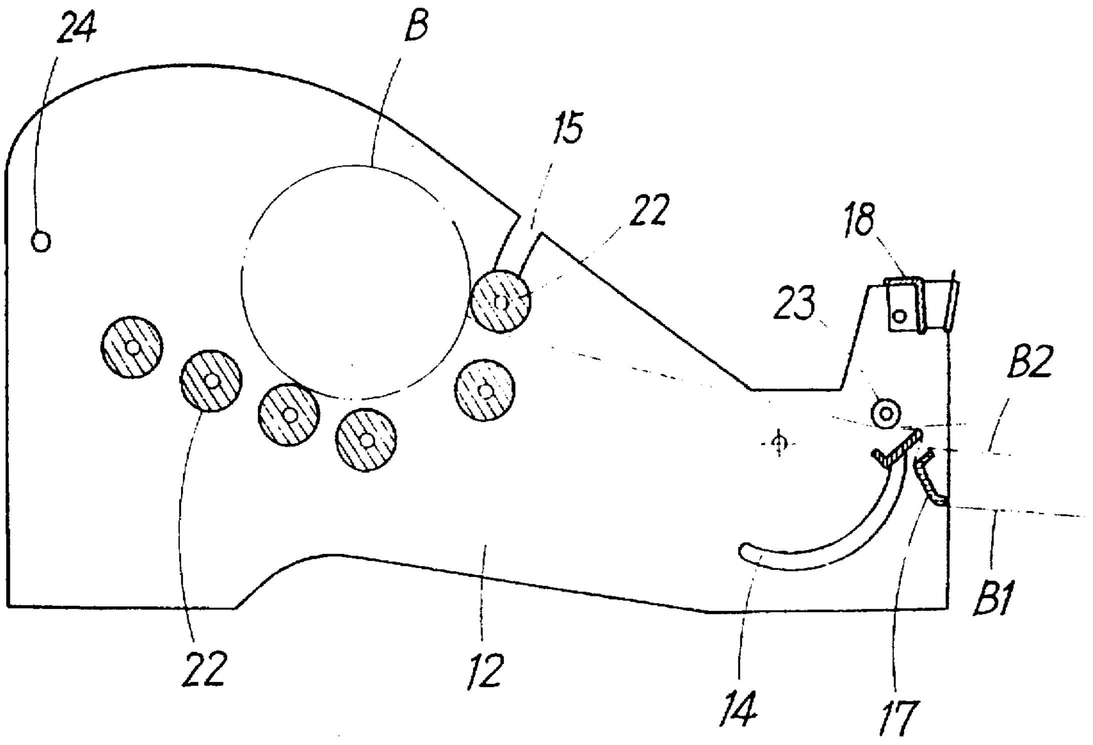
FIG. 10 illustrates the manner in which a label is peeled off from the under layer of label tape by means of the label peeler of the present invention.
Figure 11:
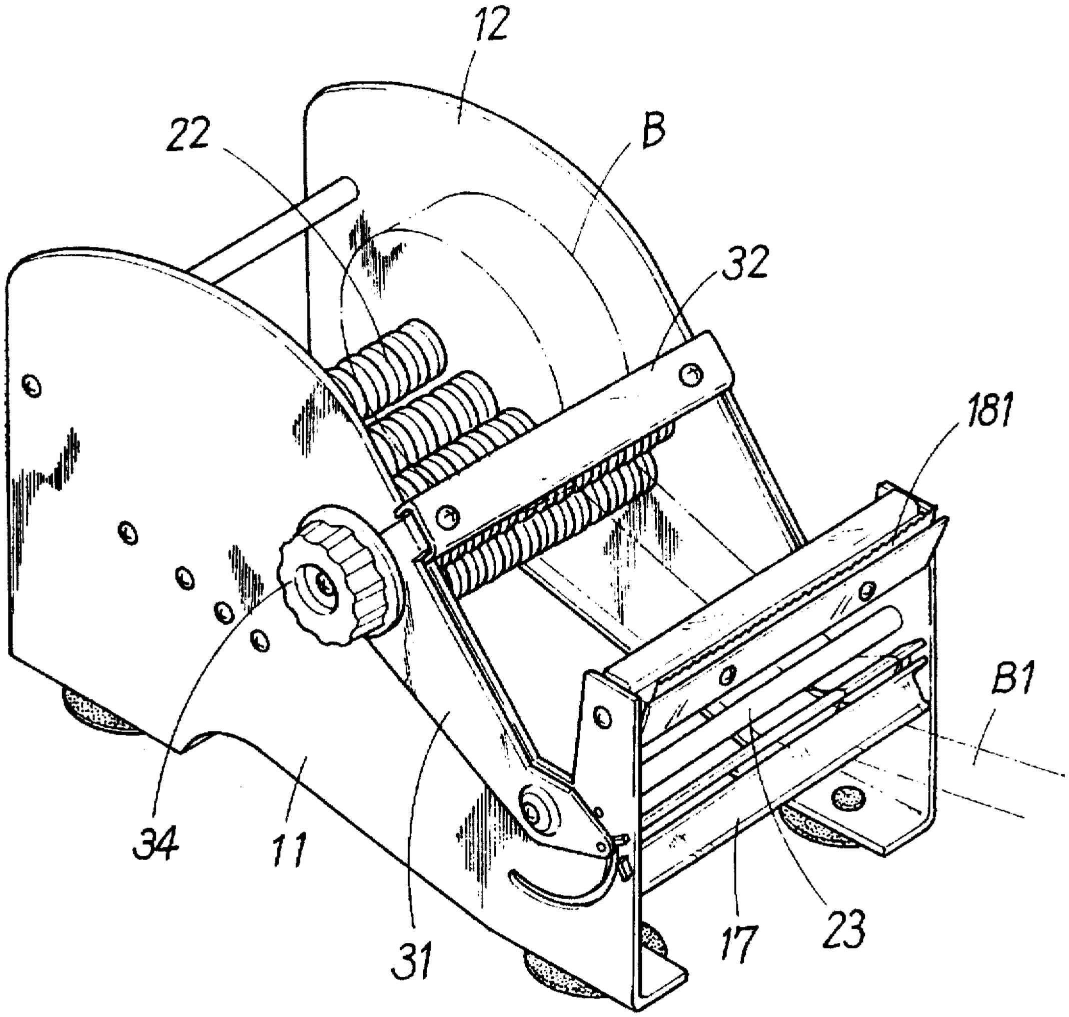
FIG. 11 is a perspective showing another embodiment of the present invention.

As to the tape B with self-adhesive labels, unlike the adhesive tape A, it does not need cutting. The tape B consists of an under layer B1 and a plurality of top self-adhesive labels B2 releasably adhered onto the under layer. As in the case of the adhesive tape A, the tape B is first seated in the cutter stand 1 by putting it around a carrier shaft 21. Then, the under layer B1 is pulled out from a front end thereof so that its front portion is positioned on and beyond the front stop member 33, as shown in FIG. 8. When the under layer B1 is well positioned, press the engaging arm assembly 3 backward so that the knobs 34 are received in the slots 15 and thereby the roll of tape B is retained in place. Due to the attachment of the engaging arm assembly 3 to the side walls 11, 12 of the cutter stand 1, the front stop member 33 is shifted upward along the moving slots 14 until it reaches and is retained to a position between the front shaft 23 and the leanding member 17, as shown in FIG. 9, causing the under layer B1 to pass beneath the front shaft 23 and bend down at the front stop member 33 and again pass beneath the leading member 17. Since the self-adhesive labels B2 is not so soft as the under layer B1, it does not bend and turn down at the front stop member 33 to pass beneath the leading member 17 as quickly as the under layer B1 when the under layer B1 does and is pulled out from an underside of the leading member 17. Thereby, the self-adhesive label B2 passing the turn at the front stop member 33 is separated from the under layer B1 and falls onto a top of the leading member 17 to be easily removed therefrom by a user. The tape B can be continuously pulled. And, as in the case of tape A, tapes B with self-adhesive labels in different sizes can be located in the cutter stand 1 at the same time, as shown in FIG. 11.

With the above arrangements, the tape cutter of the present invention for cutting an adhesive tape may be used to quickly separate self-adhesive labels from an under layer when the engaging arm assembly is pushed backward to attach to two side walls of the tape cutter stand and thereby causes the under layer of the tape with self-adhesive labels alone to pass and bend at an upward shifted front stop member between the front shaft and the leading member.

What is claimed is:

1. A tape cutter and self-adhesive label peeler comprising:

(a) a cutter stand having a pair of substantially identical side walls displaced each from the other in a lateral direction, each said side wall including a rear portion and a front portion displaced from one another in a substantially horizontal direction, each of side walls including a top portion and a bottom portion displaced from one another in a substantially vertical direction, said top portion of each of said side walls having an arcuate top edge having formed therein an engaging slot, said engaging slot being disposed above said central portion of said side wall and extending in said substantially vertical direction, said central portion of said side walls having a stud formed thereon in proximity to said engaging slot, each of said side walls having formed therethrough a plurality of shaft holding holes arranged in spaced relation to each other and extending between said central and rear portions of said side wall, said bottom portion of each of said side walls including a bottom edge having at least one vacuum cup attached thereto, said front portion having an arm support formed therein and an arcuate slot formed therethrough, said arcuate slot being coaxially disposed with respect to said arm support, said front portion having a square hole and a round hole formed therethrough on opposing sides of said arcuate slot, a leading member extending between said side walls, said leading member engaging said square holes of said side walls, a front shaft extending between said side walls, said front shaft engaging said round holes in said side walls, a blade holder extending between said front portions of said side walls for holding a cutting blade, a plurality of carrier shafts extending between said side walls adapted to carry a tape having self-adhesive labels on an under layer thereof, each said carrier shaft engaging said shaft holding holes in said side walls, each said carrier shaft having a plurality of shaft collars rotatably coupled therearound, a rear shaft extending between said rear portions of said pair of side walls, said rear shaft having a plurality of shaft collars rotatably coupled therearound; and, (b) engaging arm assembly means including a pair of substantially identical side arm members displaced from one another in said lateral direction, each said side arm having a rear portion and a front portion, said rear portion having a connecting piece formed at a rear top end thereof, said rear portion having a central hole and an arcuate pivotal slot formed therethrough, said arcuate pivotal slot being coaxially disposed with respect to said central hole, said front portion having a screw formed thereon for respective pivotal coupling to said arm support in said side wall of said cutter stand, said front portion having a hole formed therethrough, a top connecting member extending between said connecting pieces of said side arm members, a front stop member extending between said side arm members, said front stop member having a pair of opposing ends for respective engagement with said hole formed in each said front member, a pair of hobs for respective rotational engagement with said central hole of said rear portion of each said side arm member, each said hob having an inner side, said inner side having a pivotal block formed thereon for sliding engagement with said arcuate pivotal slot of said side arm member, said inner side having an arcuate groove formed therein and disposed alongside a peripheral wall thereof, whereby said cutter stand and said engaging arm assembly serve as a self-adhesive label peeler when said engaging arm assembly is securely attached to said cutter stand by pivotally displacing said engaging arm assembly about said arm supports in a first direction to bring said arcuate grooves in said hobs of said engaging arm assembly into sliding engagement with said studs on said side walls of said cutter stand, said engaging arm being secured to said side walls by rotation of said hobs, said pivotal displacement correspondingly displacing said front stop member of said engaging arm assembly along a path defined by said arcuate moving slot in said side walls, said front stop member coming to rest between said leading member and said front shaft of said cutter stand when said engaging arm assembly has been secured to said cutter stand, whereby said self-adhesive labels are peeled from said under layer of said tape when a leading edge of said under layer is fed along a path including a first portion defined between said front shaft and said front stop member and a sequential second portion defined between said front stop member and said leading member, said first and second portions having a bend defined therebetween where said self-adhesive labels are separated from said under layer.

* * * * *